United States Patent [19]

Moncrief et al.

[11] Patent Number: 5,116,051

[45] Date of Patent: May 26, 1992

[54] STRAIN GAUGE PRESSURE-SENSITIVE VIDEO GAME CONTROL

[75] Inventors: Rick L. Moncrief, Santa Clara; Erik J. Durfey, Los Gatos; Max L. Behensky, Hayward, all of Calif.

[73] Assignee: Atari Games Corporation, Milpitas, Calif.

[21] Appl. No.: 536,045

[22] Filed: Jun. 8, 1990

Related U.S. Application Data

[63] Continuation of Ser. No. 296,470, Jan. 12, 1989, abandoned.

[51] Int. Cl.⁵ ............................ A63F 9/22; G09B 9/04
[52] U.S. Cl. ........................... 273/448 B; 273/438; 434/62; 434/64; 434/65; 434/71; 434/69
[58] Field of Search .............. 273/148 B, 148 R, 438; 434/62, 64, 65, 66, 71, 20, 69, 45, 53, 38; 272/129; 73/1 B, 766, 765, 763, 132; 324/130; 188/266; 330/304, 306; 74/512, 513, 514

[56] References Cited

U.S. PATENT DOCUMENTS

| | | | |
|---|---|---|---|
| 1,952,679 | 3/1934 | Leveen | 200/6 BB |
| 2,134,323 | 10/1938 | Beach | 338/155 |
| 2,305,717 | 12/1942 | La Bell | 338/114 |
| 2,381,390 | 8/1945 | Vanke | 74/513 |
| 2,836,990 | 6/1958 | De Heer | 74/513 |
| 3,166,950 | 1/1965 | Pomeranz | 74/513 |
| 3,193,946 | 7/1965 | Patuano | 434/63 |
| 3,220,121 | 12/1965 | Cutler | 434/45 |
| 3,231,987 | 2/1966 | Schott et al. | 434/63 |
| 3,231,988 | 2/1966 | Freyde | 434/63 |
| 3,370,242 | 2/1968 | Offner | 330/253 |
| 3,562,660 | 2/1971 | Pease | 330/253 |
| 3,622,902 | 11/1971 | Thomas | 330/253 |
| 3,838,888 | 10/1974 | Gynn | 338/108 |
| 3,872,739 | 3/1975 | Hudson et al. | 74/513 |
| 3,899,924 | 8/1975 | Klein | 73/862.67 |
| 3,936,955 | 2/1976 | Gruen et al. | 273/455 |
| 4,117,809 | 10/1978 | Kittler | 123/98 |
| 4,190,804 | 2/1980 | Pyne et al. | 340/599 |
| 4,213,348 | 7/1980 | Reinertson et al. | 73/765 |
| 4,422,851 | 12/1983 | Hayashigawa et al. | 434/45 |
| 4,559,313 | 4/1986 | Kuster et al. | 273/148 B |
| 4,608,533 | 8/1986 | Starkie | 324/130 |
| 4,639,710 | 1/1987 | McMillan et al. | 220/86.5 |
| 4,660,828 | 4/1987 | Weiss | 273/148 B |
| 4,711,450 | 12/1987 | McArthur | 272/129 |
| 4,747,296 | 5/1988 | Feldon et al. | 324/130 |
| 4,750,888 | 6/1988 | Allard et al. | 434/64 |
| 4,856,771 | 8/1989 | Nelson et al. | 434/45 |
| 4,928,085 | 5/1990 | DuRand, III et al. | 340/544 |

FOREIGN PATENT DOCUMENTS 2159111 12/1985 United Kingdom ............... 434/71

OTHER PUBLICATIONS

Smith, Ralph, *Circuits, Devices and Systems*. 4th ed., John Wiley & Sons: New York, 1984, pp. 449–450.
*Standard Handbook for Electrical Engineers*, 10th ed., Donald Fink, Editor in Chief, McGraw-Hill Inc.: New York, 1968, pp. 5/20–21, 5/30–31.

*Primary Examiner*—Theatrice Brown
*Assistant Examiner*—Jessica J. Harrison
*Attorney, Agent, or Firm*—Ronald C. Fish

[57] ABSTRACT

A pressure-sensitive control device for a simulated vehicle in a video game or simulator. In the preferred embodiment a brake pedal control device is implemented having a strain gauge which senses the strain in the material of the brake pedal. This strain is amplified by a differential amplifier having a self-adjusting input circuit with a long time constant which causes any variations in the input voltage not due to changing strain on the brake pedal to be applied to both inputs of a differential amplifier in common mode, thereby cancelling the effect thereof. Only voltage differences resulting from variations in the strain on the brake pedal are amplified by the differential amplifier and output for use by the video game or simulator.

18 Claims, 3 Drawing Sheets

STRAIN GAUGE PRESSURE-SENSITIVE VIDEO GAME CONTROL

This application is a continuation of application Ser. No. 296,470, filed Jan. 12, 1989, abandoned.

BACKGROUND OF THE INVENTION

The invention pertains to the field of video game controls, and, more particularly, to the field of video game controls which are pressure rather than location sensitive.

In prior art video game technology, various control mechanisms were used to control action in the game. Some prior art games involved a simulated vehicle moving in a simulated environment and had steering wheels, gas pedals, brake pedals and gearshift controls for the simulated vehicle. These prior art game controls, however, were used to control the game by virtue of the position of the control, as opposed to how strongly or softly the player was pushing on the control. For certain situations, such a game control is a fairly realistic simulation of a similar control in a real-life vehicle. However, for other situations, such as brake pedals and gearshift levers, such a control is not a realistic simulation. For example, in a real car, a brake pedal may travel a short distance with relatively small but growing resistance to its movement. Thereafter, the resistance to movement of the brake pedal increases substantially more rapidly, to the point where the brake pedal can hardly be moved at all. Furthermore, the harder the operator presses on the brake pedal, the more braking action will occur, although the brake pedal will not move other than perhaps a small fraction of an inch. Heretofore game controls of the position-sensing variety were not able to realistically simulate such a control device. Therefore, a need has arisen for a new type of video game control device which is pressure sensitive and which generates an output signal which tracks the pressure applied to the control device even though the control device itself is not moving.

SUMMARY OF THE INVENTION

There is taught herein an apparatus and method for sensing the amount of strain in the material of a control device for a simulated vehicle resulting from pressure applied to the control device by an operator of the simulated vehicle. An electrical output which tracks the degree of strain is generated for use by a computer which implements the control of the simulated vehicle in the simulated environment.

In a preferred embodiment, the control device selected for use in illustrating the teachings of the invention is a brake pedal. At least two different embodiments of a brake pedal are disclosed herein. In a preferred embodiment of the brake pedal, a brake pedal arm is attached to a frame at a pivot point and elastically coupled to the frame by a two-stage elastic coupling at a second point on the brake pedal level arm. A strain gauge is attached to the metal of the brake pedal level arm at a point below the pivot. In operation, depression of the brake pedal compresses a spring until such time as the second stage of elastic material is contacted. In the preferred embodiment, this second stage of elastic material is a stiff but compressible plastic such as polypropylene. Further movement of the brake pedal compresses the polypropylene, which has a much stiffer spring constant than the spring which is compressed during the first stage of compression. Because of the stiffer spring constant, the brake pedal moves a shorter distance, and it requires a greater force to move the brake pedal during this second stage of depression.

During the second stage of compression, the increased levels of force applied to the brake pedal cause an increased level of strain in the metal of the brake pedal lever arm. This strain causes changes in the path length of a strain gauge which is bonded to the surface of the brake pedal lever arm. These changes are sensed by a differential amplifier which is coupled to the strain gauge. The differential amplifier circuit includes a regulated power supply which supplies a regulated voltage to a voltage divider circuit comprised of a fixed resistor and the strain gauge. The output voltage at the middle node is applied to the input of a FET input stage operational amplifier through a self-adjusting circuit. The self-adjusting circuit is composed of a resistor-capacitor combination which has a time constant which is substantially longer than the duration of the force pulses applied to the brake pedal. The purpose of the self-adjusting circuit is to compensate for long-term changes such as changes in temperature or changes in the operative voltage of the circuit such that these changes affect both the inverting and the noninverting input of the operational amplifier equally, i.e., are common mode changes. Thus, the only changes applied to the input of the operational amplifier which affect it output are those changes caused by strain in the brake pedal which changes the resistance of the strain gauge.

The second embodiment of a brake pedal according to the teachings of the invention does not use a pivoting brake pedal but a simple fixed lever arm attached to an immobile frame and having a strain gauge bonded to the surface thereof. The player presses on the lever arm, thereby inducing changes in the resistance of the strain gauge. The lever arm, however, does not move in response to the player's force input thereto.

DETAILED DESCRIPTION OF THE PREFERRED EMBODIMENT

Figure 1:
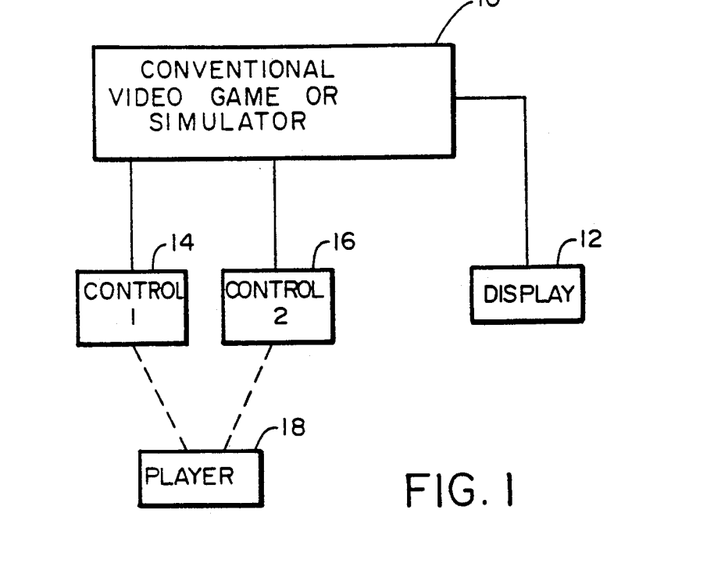
FIG. 1 is a block diagram of a conventional video game or simulator apparatus in which the teachings of the invention may be used.

Referring to FIG. 1, there is shown a block diagram of a typical video game or simulator system in which the teachings of the invention may be employed. In the system of FIG. 1, a conventional video game or simulator unit 10 is coupled to a display 12 and control units 14 and 16. A player 18 manipulates the control units 14 and 16 in response to scenes of a simulated environment displayed on the display 12 by the conventional video game or simulator 10. The video game or simulator is programmed to read player inputs in the form of forces applied by the player 18 to control units 14 and 16 and to cause a simulated vehicle displayed in an environment on display 12 to respond to those control inputs. In conventional video games and simulators, the control units 14 and 16 are position sensitive only. This means that the video game or simulator 10 cannot sense the amount of force applied by the player 18 on the control units 14 and 16 if that force does not result in movement or additional movement of the control units 14 and 16. According to the teachings of the invention, however, control units 14 and 16 can be made in such a way that the conventional video game or simulator 10 can sense the amount of force applied by the player 18 on the control units even if this force does not result in any movement of the control device symbolized by either control unit 14 or 16.

The type of vehicle and type of environment displayed on the display 12 by the conventional video game or simulator 10 is not critical to the invention. Nor is the structure of the conventional video game or simulator 10 critical to the teachings of the invention. The teachings of the invention contemplate use of controls which output signals which vary with the amount of force applied by the player even where that force does not result in movement of the control device.

According to the teachings of the invention, a pressure-sensitive control device suitable for use as the control units 14 and 16 in the system of FIG. 1 involves two fundamental elements. One of these elements is a control device which may be acted upon by the player, such as a brake pedal, gearshift, or other such typical control for use in controlling the movements of a vehicle. The other element is an electronic means for sensing strain in the material of the control device and for converting this strain into a corresponding electronic signal. Typically, this electronic device comprises a strain gauge and a differential amplifier.

Figure 2:
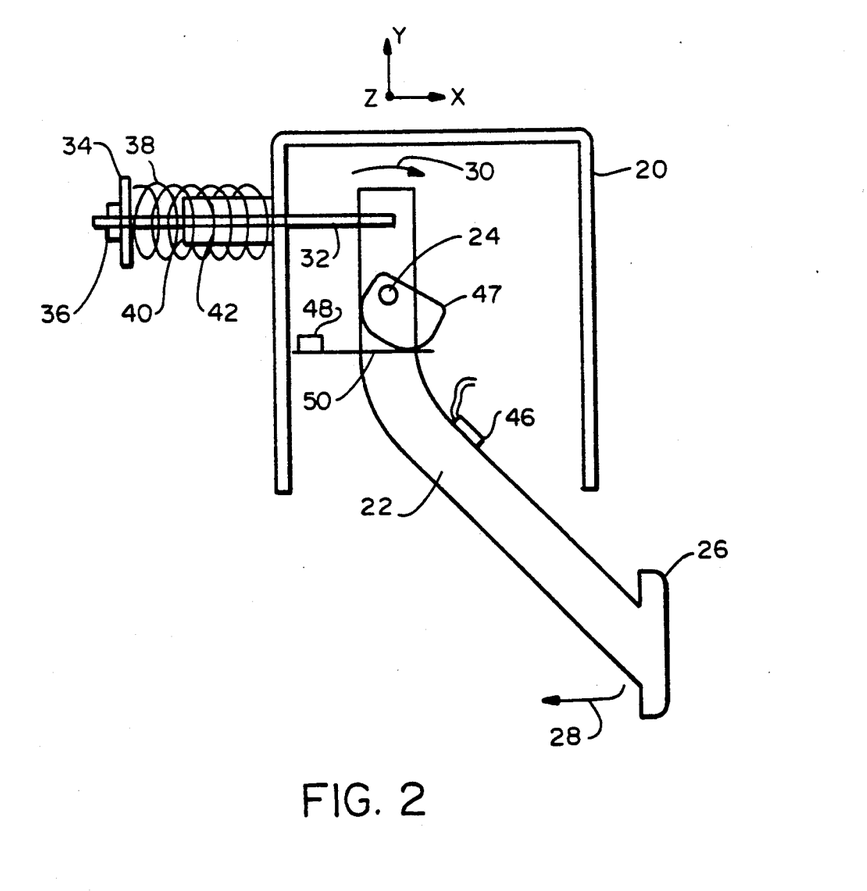
FIG. 2 is a diagram of the preferred embodiment of a brake pedal used to illustrate the teachings of the invention.

Referring to FIG. 2, there is shown the preferred embodiment of a typical control device in the form of a brake pedal for a car. This brake pedal is mechanically arranged to have movement which simulates the movement of a real brake pedal. The brake pedal of FIG. 2 is comprised of a frame 20 coupled to a brake pedal lever arm 22. The brake pedal lever arm is pivotally coupled to the frame 20 by a pivot pin 24. The brake pedal lever arm has a brake pedal pad 26 which the player 18 pushes with his or her foot. This sends a signal to the video game or simulator 10 that the player 18 desires to stop or slow down the vehicle displayed on the display 12 in response to conditions in the environment displayed on display 12. In response to force exerted on the brake pedal pad 26, the brake pedal lever arm 22 pivots around the pivot point 24 in the direction shown by arrow 28. This causes the segment of the lever arm 22 above the pivot point 24 to move in the manner depicted by arrow 30.

The lever arm 22 is coupled by a connecting rod 32 through a hole in the frame 20 to a washer 34 and a nut 36. This washer 34 and nut 36 move in the positive X direction as the top portion of the lever arm 22 moves to the right along a path parallel to the arrow 30. As the washer 34 moves in the positive X direction, a spring 38 is compressed. This causes linearly increasing force to be exerted against the washer 34 in the negative X direction. Eventually, the spring 38 will be compressed to the point that the washer 34 makes contact with the surface 40 of an elastic bumper 42 made of a material such as polypropylene. This bumper 42 has a clearance hole formed therein for the connecting rod 32. The connecting rod passes through the clearance hole in the bumper 42 along the centerline of the spring 38 to the point where the washer 34 is affixed to the connecting rod by the nut 36. When the washer 34 contacts the surface 40, a second stage of compression is entered. In this stage, the brake pedal pad 26 must be pressed much harder to cause further pivoting of the brake pedal arm 22 in the direction of arrow 28. This is because the polypropylene bumper 42 is a much stiffer elastic material and takes much greater force to compress it. During this second stage of compression, both the spring 38 and the polypropylene bumper 42 are being compressed with further pivoting of the brake lever arm 22.

A strain gauge 46 is bonded to the material of the brake pedal lever arm 22 at a position to sense strain in the brake pedal lever arm as force is applied to the brake pedal 26. The strain gauge is of conventional structure and may be either of the metallic or semiconductor type. Generally, semiconductor strain gauges are more sensitive. However, they are also more temperature sensitive in that their accuracy varies greatly with the ambient temperature. The strain gauge 46 is essentially a serpentine resistive path which is bonded to the material of the brake pedal lever 22. As strain occurs in the material of the brake pedal lever, the resistive path of the strain gauge is either elongated or shortened. This results in a changed resistance for the strain gauge. This changed resistance can be detected by a suitable amplifier and converted to a digital signal for use by the video game or simulator 10 in FIG. 1.

The brake pedal embodiment of FIG. 2 also includes a cam 47 which is attached to the lever arm 22 so as to rotate synchronously with the lever arm 22. A microswitch 48 having an actuating lever 50 which rides on the surface of the cam 47 is attached to the frame 20. The purpose of the microswitch 48 is to sense when the brake pedal 26 has been depressed and to change electrical states in response thereto. The reason for this will be made clear later.

Figure 3:
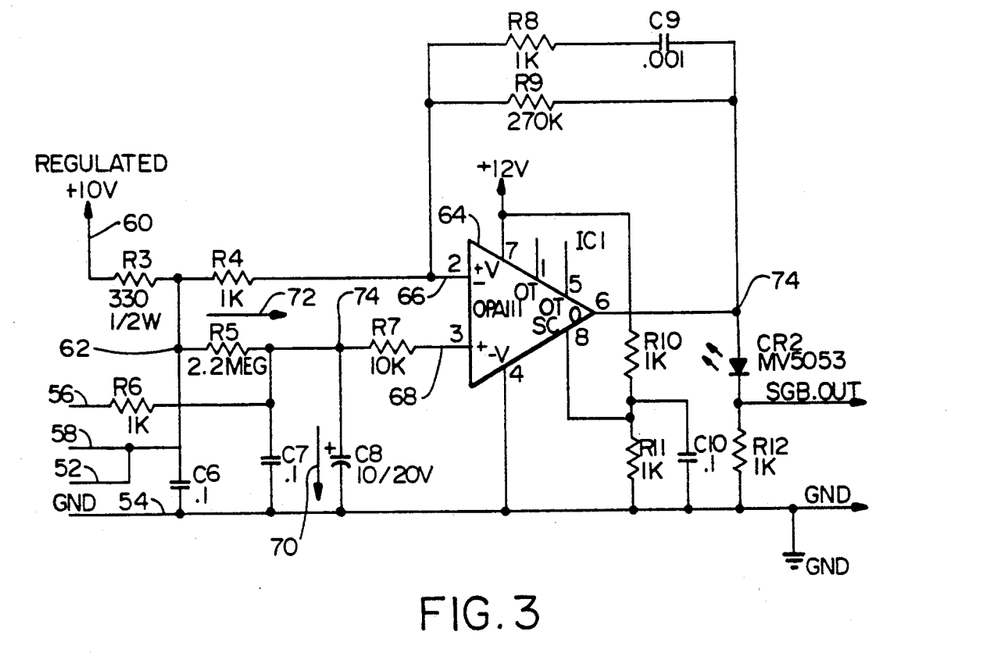
FIG. 3 is a circuit diagram of the preferred embodiment of an amplifier for use in reading a strain gauge on a control device in response to force applied thereto and for generating a signal indicative of the strain.

Referring to FIG. 3 there is shown a circuit diagram for an operational amplifier which may be coupled to the strain gauge 46 in FIG. 2 to generate an analog output signal which tracks variations in the strain in the brake pedal lever 22. In FIG. 3, the strain gauge 46 is coupled between terminals 52 and 54. The microswitch 48 is coupled between terminals 56 and 58. A regulated positive 10 volts is applied to terminal 60. The resistor R3 forms a voltage divider with the resistance of the strain gauge 46 resulting in a variable voltage at the node 62. The voltage at node 62 varies with the degree of strain in the brake pedal lever 22. The duration of these voltage variations generally tracks the duration of the application of force to the brake pedal 26 by the player. It is these variations in voltage at the node 62 that are amplified by amplifier 64.

The voltage at node 62 can also vary with a much longer time constant due to aging of components, slow shifts in the level of voltage applied to the node 60, temperature variations, and so on. The amplifier of FIG. 3 cancels any such long time-constant shifts in the voltage at node 62 by applying them in common mode to both inputs of the differential amplifier 64. Application of long-term variations of the voltage on node 62 in common mode is implemented by use of a resistor-capacitor circuit comprised of the resistor R5 and the capacitor C8. The operational amplifier 64 has a field effect transistor input stage (not shown) which draws very little input current at the inverting input 66 and the noninverting input 68. The leakage current across the capacitor C8, a tantalum capacitor, symbolized by arrow 70, is therefore substantially equal to the current through the resistor R5 symbolized by arrow 72. The resistor R5 and capacitor C8 have a time constant of approximately 20 seconds. Any variation in the voltage on node 62 having a time constant of 20 seconds or longer will eventually be reflected in the voltage at node 74. The voltage at node 74 therefore will be substantially equal to the average voltage at node 62 which is coupled to the inverting input 66. Therefore, any long-term variations in the voltage in node 62 having a time constant greater than the RC time constant of R5 and C8 will be applied in common mode both to the inverting input at 66 and to the noninverting input at 68. This is because the capacitor C8 holds the node 74 equal to the long-term average of the voltage at node 62. Short-term fluctuations in the voltage at the node 62 will vary the voltage at the inverting input 66 away from the average voltage at node 74 and will be amplified in differential mode by the amplifier 64.

The voltage gain of the amplifier 64 is established by the resistors R4 and R9. In the circuit of FIG. 3, this voltage gain is 270. The voltage at the output node 74 is therefore equal to the quiescent output voltage at node 74 when there is no differential input voltage between terminals 66 and 68 minus 270 times the differential voltage between terminals 66 and 68. Essentially, the voltage difference between the terminals 66 and 68 is the voltage drop across the resistor R5.

The capacitor C8 is selected to have a very low leakage current on the order of nominally 1 nanoampere. The operational amplifier 64 is a model OPA-111 manufactured by Burr-Brown in the preferred embodiment. In analog devices, a D-711 model operational amplifier is also acceptable for purposes of practicing the invention.

Figure 4:
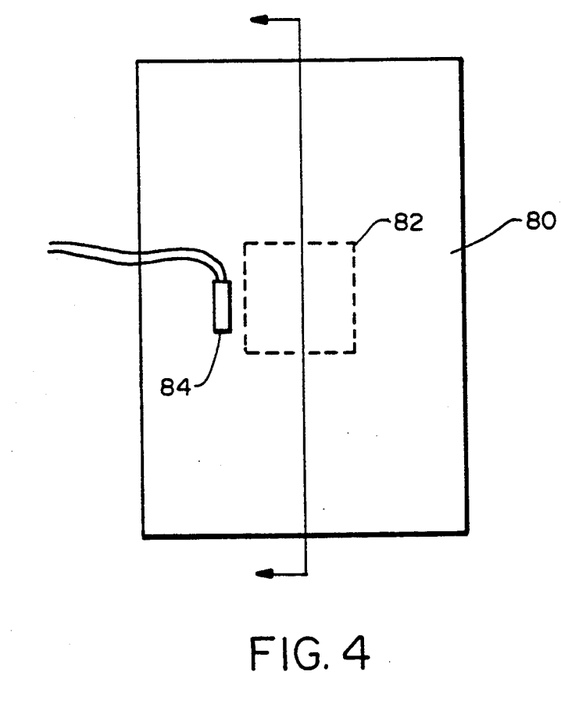
FIG. 4 is a front view of an alternative embodiment of a brake pedal for use in illustrating the teachings of the invention.
Figure 5:
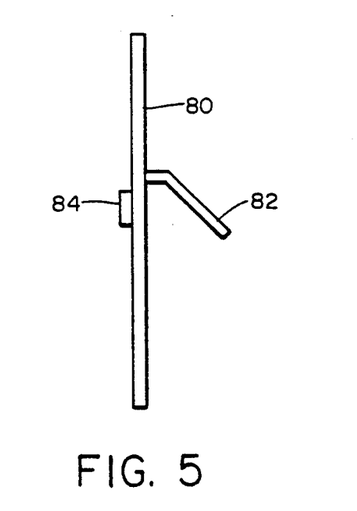
FIG. 5 is a side view of the brake pedal of FIG. 4.

Referring to FIG. 4 and 5, there are shown, respectively, a front view and a side view of a nonmoving brake pedal according to the teachings of the invention. Referring jointly to FIG. 4 and FIG. 5, a metal plate 80 has been welded to one side thereof a bent brake pedal 82. On the opposite side of the metal plate 80 there is bonded to the surface of the metal a strain gauge 84.

In operation, the player presses on the simulated brake pedal 82, thereby causing stress in the metal plate 80. This stress elongates or shortens the serpentine resistive path of the strain gauge 84, which is then sensed by an amplifier circuit such as that shown in FIG. 3.

Figure 6:
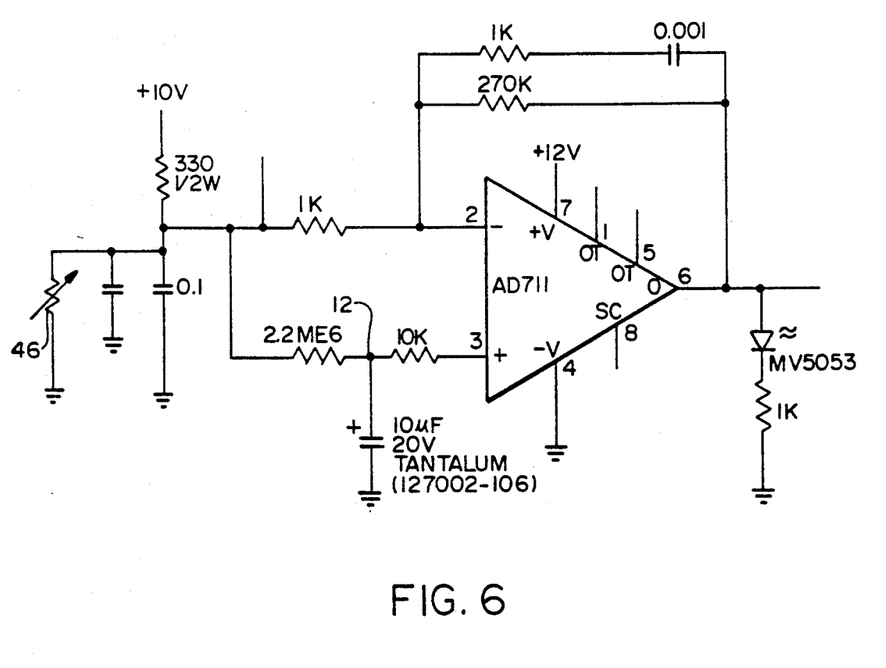
FIG. 6 is an alternative embodiment of an amplifier for use in reading a strain gauge.

An alternative amplifier circuit is shown in FIG. 6.

Referring to FIG. 6, the major difference between the amplifier circuit of FIG. 6 and the amplifier circuit of FIG. 3 is the omission of the microswitch terminals 56 and 58 in the amplifier circuit of FIG. 6. In the amplifier circuit of FIG. 3, the microswitch is coupled to the terminals 56 and 58 to essentially substitute the much lower resistance of resistor R6 for the resistor R5 at power-up time. The microswitch 48 in FIG. 2 is closed when the brake pedal is not depressed. This is the general condition when the circuit is powered up. Because the resistance of resistor R6 is much smaller, the time constant of the R-C circuit comprised of R6 and C8 is much smaller. Therefore, the quiescent voltage at node 74 is reached in much less time than the normal 20-second time constant caused by the resistor R5 and the capacitor C8. As soon as the brake pedal 26 is pressed, indicating that the game is being played, the microswitch 48 opens, thereby substituting the resistor R5 for the resistor R6. This causes the amplifier 64 to amplify only those differences in voltages on the node 62 caused by changes in the stress level of the brake pedal lever arm 22.

In the amplifier of FIG. 6, this speeded-up time constant is not used. Other than that, the amplifier of FIG. 6 works in the same way as the amplifier of FIG. 3.

Although the invention has been described in terms of the preferred and alternative embodiments discussed herein, those skilled in the art will appreciate many variations which may be made without departing from the true spirit and scope of the invention. All such variations are intended to be included within the scope of the claims appended hereto.

What is claimed is:

1. An apparatus for simulating the feel of a real control device for a real vehicle and generating an output signal, said apparatus comprising:
    means for displaying to an operator a simulated environment in which a simulated vehicle moves;
    simulated control device means for simulating the feel of a real control device for a real vehicle and generating an output signal, said simulated control device means being in contact with a mechanical structure including a multistage force simulator means for applying forces to said simulated control device means to simulate the real forces that would resist movement of said real control device, said multistage force simulator means including at least a first elastic means for providing a first level of resistance to movement of said simulated control device means in a first range of movement to simulate a first range of movement inherent in a real control device and a second elastic means for providing a second level of resistance to movement of said simulated control device means which is greater than said first level of resistance to movement, said second level of resistance acting upon said simulated control device means only after said simulated control device means is moved to a predetermined position beyond said first range of movement by force applied to said simulated control device means;
    strain gauge means mounted on said simulated control device means for sensing the amount of strain in said simulated control device means resulting from forces placed upon said simulated control device means by said operator of said simulated vehicle in response to stimuli in said simulated environment displayed to said operator, wherein an electrical parameter of said strain gauge means varies with the amount of said strain; and
    amplifier means coupled to said strain gauge means for sensing a change in said electrical parameter of said strain gauge means and for generating an output signal indicative of said change in said electrical parameter which is thereby indicative of the amount of force placed on said simulated control device means by said operator.

2. The apparatus of claim 1 wherein said amplifier means further comprises filter means for preventing changing conditions acting upon said amplifier means and having a duration or period longer than a predetermined time constant, such as changing temperatures or changing supply voltage, from affecting the output signal of the amplifier thereby insuring that changes in the output signal of the amplifier are caused substantially only by changes in the strain sensed b said strain gauge means.

3. The apparatus of claim 2 wherein said amplifier means comprises a field effect transistor input stage differential amplifier.

4. The apparatus of claim 1 wherein said output signal of said amplifier means causes said means for displaying to alter a display to show effects of said amount of strain in said simulated control device on said simulated vehicle.

5. The apparatus of claim 1 wherein said multistage force simulator means is a two stage force simulator means.

6. An apparatus for simulating the feel of a real control device for a real vehicle and generating an output signal, said apparatus comprising:
means for displaying a simulated environment and a simulated vehicle in said simulated environment to an operator;
simulated control device means for simulating the feel of a real control device for a real vehicle and generating an output signal and connected to a mechanical structure including a multistage force simulator means for applying forces to said simulated control device means to simulate the real forces that would resist movement of said real control device, including a first level of resistance to movement in a first range of movement and a second level of resistance to movement which is substantially greater than said first level of resistance to movement, said second level of resistance acting upon said simulated control device means only after said simulated control device means is moved to a predetermined position beyond said first range of movement by force applied to said simulated control device means;
strain gauge means mounted on said simulated control device means for sensing the amount of strain in said simulated control device means resulting from forces placed upon said simulated control device means by said operator of said simulated vehicle in response to stimuli in said simulated environment displayed to said operator, wherein an electrical parameter of said strain gauge means varies with the amount of said strain; and
amplifier means coupled to said strain gauge means for sensing a change in said electrical parameter of said strain gauge means and for generating an output signal indicative of said change in said electrical parameter which is thereby indicative of the amount of force placed on said simulated control device means by said operator,
wherein said amplifier means further comprises filter means for preventing changing conditions acting upon said amplifier means and having a duration or period longer than a predetermined time constant, such as changing temperatures or changing supply voltage, from affecting the output signal of the amplifier thereby insuring that changes in the output signal of the amplifier are caused substantially only by changes in the strain sensed by said strain gauge means,
wherein said amplifier means comprises a field effect transistor input stage differential amplifier, and
wherein said filter means includes a resistor-capacitor combination which has a time constant which is substantially greater than the average duration or period of those changes in said electrical parameter of said strain gauge means which result from pressure put on said control device means by an operator of said simulated vehicle, said resistor-capacitor combination being coupled to said differential amplifier in such a way that changes in said electrical parameter of said strain gauge means having a period or duration longer than said time constant act on the inputs of said differential amplifier in common mode and do not cause changes in said output signal from said differential amplifier whereas changes in said electrical parameter of said strain gauge means having a duration or period shorter than said time constant act on the inputs of said differential amplifier in differential mode and are amplified thereby creating an automatic, continuously operating compensation network to cause said differential amplifier to amplify only those voltage changes which have a sufficiently short duration.

7. A video game control comprising:
means for displaying a simulated vehicle in a simulated environment;
a control device upon which force may be applied, said control device including means for counteracting said applied force, said counteracting means allowing said control device to be displaced a distance in accordance with a first function when said applied force is within a known range and allowing said control device to be displaced a distance in accordance with a second function when said applied force exceeds said range;
means for reading the strain induced in said control device by said force and for generating a signal indicative of the level of strain for use by said means for displaying in controlling the movements of said simulated vehicle in said simulated environment, said means for reading including a strain gauge coupled through a compensation network to a differential amplifier having an inverting input and a noninverting input, said compensation network including filter means for automatically and continuously preventing voltage changes having a duration longer than a predetermined interval from reaching the inputs of said differential amplifier, but for allowing voltage changes having a duration shorter than a predetermined interval to be amplified.

8. The apparatus of claim 7 wherein said differential amplifier includes a field effect transistor input stage, and wherein said strain gauge is affixed to said control device in a location such that strain induced in said control device alters the electrical characteristics of said strain gauge.

9. A video game control comprising:
means for displaying a simulated vehicle in a simulated environment;
a control device upon which force may be applied, said control device including means for counteracting said applied force, said counteracting means allowing said control device to be displaced a distance in accordance with a first function when said applied force is within a known range and allowing said control device to be displaced a distance in accordance with a second function when said applied force exceeds said range;
means for reading the strain induced in said control device by said force and for generating a signal indicative of the level of strain for use by said means for displaying in controlling the movements of said simulated vehicle in said simulated environment, said means for reading including a strain gauge coupled through a compensation network to a differential amplifier having an inverting input and a noninverting input, said compensation network including filter means for automatically and continuously preventing voltage changes having a duration longer than a predetermined interval from reaching the inputs of said differential amplifier, but for allowing voltage changes having a duration shorter than a predetermined interval to be amplified, wherein said differential amplifier includes a field effect transistor input stage, and wherein said strain gauge is affixed to said control device in a location such that strain induced in said control device alters the electrical characteristics of said strain gauge, and wherein said filter means includes a resistor-capacitor network having an RC time constant substantially longer than the average periods of those voltage changes due to the application of force to said control device by a player, said resistor-capacitor network comprising a resistor and a capacitor having a common first node coupled to one of said inverting or noninverting inputs of said differential amplifier, and wherein said strain gauge comprises a resistor which changes resistance in response to strain induced in said control device by forces exerted by said player, said filter means further including a voltage divider comprised of a fixed resistor in series with said strain gauge, said fixed resistor having a first terminal for coupling to a voltage source and having a second terminal coupled to said strain gauge and to said resistor in said resistor-capacitor network and to the input of said differential amplifier which is not coupled to said common first node between said resistor and said capacitor of said resistor-capacitor network thereby creating said compensation network which applies voltage changes at said second terminal of a duration shorter than said RC time constant differentially to said inverting and noninverting inputs and amplifies them, but which applies long term changes of voltage at said second terminal having a duration longer than said RC time constant to both the inverting and noninverting inputs in common mode thereby preventing such long term changes from being amplified.

10. A video game control comprising:

a control device upon which force may be applied;

means for reading the strain induced in said control device by said force and for generating a signal indicative of the level of strain for use by said means for displaying in controlling the movements of said simulated vehicle in said simulated environment, said means for reading including a strain gauge coupled through a compensation network to a differential amplifier having an inverting input and a noninverting input, said compensation network including filter means for automatically and continuously preventing voltage changes having a duration longer than a predetermined interval from reaching the inputs of said differential amplifier, but for allowing voltage changes having a duration shorter than a predetermined interval to be amplified, wherein said differential amplifier includes a field effect transistor input stage, and wherein said strain gauge is affixed to said control device in a location such that strain induced in said control device alters the electrical characteristics of said strain gauge, and wherein said filter means includes a resistor-capacitor network having an RC time constant substantially longer than the average periods of those voltage changes due to the application of force to said control device by a player, said resistor-capacitor network comprising a resistor and a capacitor having a common first node coupled to one of said inverting or noninverting inputs of said differential amplifier, and wherein said strain gauge comprises a resistor which changes resistance in response to strain induced in said control device by forces exerted by said player, said filter means further including a voltage divider comprised of a fixed resistor in series with said strain gauge, said fixed resistor having a first terminal for coupling to a voltage source and having a second terminal coupled to said strain gauge and to said resistor in said resistor-capacitor network and to the input of said differential amplifier which is not coupled to said common first node between said resistor and said capacitor of said resistor-capacitor network thereby creating said compensation network which applies voltage changes at said second terminal of a duration shorter than said RC time constant differentially to said inverting and noninverting inputs and amplifies them, but which applies long term changes of voltage at said second terminal having a duration longer than said RC time constant to both the inverting and noninverting inputs in common mode thereby preventing such long term changes from being amplified; and wherein said capacitor is a low leakage tantalum capacitor coupled between said noninverting input and a reference voltage source so as to maintain the voltage of a second node coupled both to said noninverting input and to said inverting input at an average long term voltage which can vary slowly with changing conditions if the changing conditions change over an interval longer than said RC time constant, said average long term voltage being applied to both said inverting and noninverting inputs in common mode and wherein said strain gauge and said resistor of said RC network are coupled to said capacitor such that strain induced in said control device causes voltages to be developed across said resistor of said resistor-capacitor combination which vary the voltage at said second node such that a voltage change dependent upon said strain having a duration or period smaller than said RC time constant is applied differentially to said inverting terminal relative to said noninverting terminal and is thereby amplified.

11. An apparatus for sensing the amount of pressure placed upon a simulated brake pedal for a simulated vehicle, comprising:

means including a display for displaying said simulated vehicle in a simulated environment;

a simulated brake pedal including a lever arm for receiving an applied force and means for counteracting said applied force, said counteracting means allowing said lever arm to be displaced a distance in accordance with a first function when said applied force is within a known range and allowing said lever arm to be displaced a distance in accordance with a second function when said applied force exceeds said range;

a strain gauge coupled to said simulated brake pedal in a position such that strain in said lever arm of said brake pedal will affect electrical characteristics of said strain gauge;

an amplifier coupled to said strain gauge and including an automatic, continuously operating compensation network which prevents substantially all events other than changes in the strain of said brake pedal from affecting the output of said amplifier, said output of said amplifier causing a change in movement of said simulated vehicle displayed in said simulated environment by said display in response to a change in strain in said brake pedal.

12. An apparatus for sensing the amount of pressure placed upon a simulated brake pedal of a simulated vehicle, said apparatus comprising:

means including a display for displaying said simulated vehicle in a simulated environment;

a simulated brake pedal including a lever arm movement of which is resisted by a resilient structure;

a strain gauge coupled to said simulated brake pedal in a position such that strain in said lever arm of said brake pedal will affect electrical characteristics of said strain gauge;

an amplifier coupled to said strain gauge, wherein said simulated brake pedal is mounted so as to be movable and includes a multistage resistance means for resisting movement of said simulated brake pedal in at least two stages, said multistage resistance means including at least a first elastic means for providing a first level of resistance to movement of said simulated brake pedal in a first range of movement to simulate a first range of movement inherent in a real brake pedal of a vehicle and a second elastic means for providing a second level of resistance to movement of said simulated brake pedal which is substantially greater than said first level of resistance to movement, said second level of resistance acting upon said simulated brake pedal only after said simulated brake pedal is moved to a predetermined position beyond said first range of movement by force applied to said simulated brake pedal.

13. An apparatus for sensing the amount of pressure placed upon a simulated brake pedal for a simulated vehicle, said apparatus comprising:

means including a display for displaying said simulated vehicle in a simulated environment;

a simulated brake pedal including a lever arm for receiving an applied force and means for counteracting said applied force, said counteracting means allowing said lever arm to be displaced a distance in accordance with a first function when said applied force is within a known range and allowing said lever arm to be displaced a distance in accordance with a second function when said applied force exceeds said range;

a strain gauge coupled to said simulated brake pedal in a position such that strain in said lever arm of said brake pedal will affect electrical characteristics of said strain gauge; and an amplifier coupled to said strain gauge, wherein said brake pedal is immovable other than to undergo strain when force is applied to said brake pedal.

14. A control device for a video game comprising:

means including a display for displaying a simulated vehicle in a simulated environment;

a simulated brake pedal including a lever arm for receiving an applied force and means for counteracting said applied force, said counteracting means allowing said lever arm to be displaced a distance in accordance with a first function when said applied force is within a known range and allowing said lever arm to be displaced a distance in accordance with a second function when said applied force exceeds said range;

a strain gauge coupled to said simulated brake pedal in a position such that strain in said lever arm of said b rake pedal will affect the electrical characteristics of said strain gauge;

an amplifier; and a high pass filter means for continuously coupling said strain gauge to said amplifier such that substantially only signals caused by application of momentary force to said simulated brake pedal are amplified by said amplifier.

15. An apparatus for simulating the feel of a real control device for a real vehicle and generating an output signal, said apparatus comprising:

means for displaying a simulated environment and a simulated vehicle in said simulated environment to an operator;

simulated control device means for simulating the feel of a real control device for a real vehicle and generating an output signal, said simulated control device means being in contact with a mechanical structure including a multistage force simulator means for applying forces to said simulated control device means to simulate the real forces that would resist movement of said real control device, said multistage force simulator means including at least a first elastic means for providing a first level of resistance to movement of said simulated control device means in a first range of movement to simulate a first range of movement inherent in a real control device and a second elastic means for providing a second level of resistance to movement of said simulated control device means which is greater than said first level of resistance to movement, said second level of resistance acting upon said simulated control device means only after said simulated control device means is moved to a predetermined position beyond said first range of movement by force applied to said simulated control device means;

strain gauge means mounted on said simulated control device means for sensing the amount of strain in said simulated control device means resulting from forces placed upon said simulated control device means by said operator of said simulated vehicle in response to stimuli in said simulated environment displayed to said operator, wherein an electrical parameter of said strain gauge means varies with the amount of strain; and amplifier means coupled to said strain gauge means for sensing a change in said electrical parameter of said strain gauge means and for generating an output signal indicative of said change in said electrical parameter which is thereby indicative of the amount of force placed on said simulated control device means by said operator, wherein said amplifier means further comprises filter means for preventing changing conditions acting upon said amplifier means and having a duration or period longer than a predetermined time constant, such as changing temperatures or changing supply voltage, from affecting the output signal of the amplifier thereby insuring that changes in the output signal of the amplifier are caused substantially only by changes in the strain sensed by said strain gauge means, wherein said amplifier means comprises a field effect transistor input stage differential amplifier, and wherein said filter means includes a resistor-capacitor combination which has a time constant which is substantially greater than the average duration or period of those changes in said electrical parameter of said strain gauge means which result from pressure put on said control device means by an operator of said simulated vehicle, said resistor-capacitor combination being coupled to said differential amplifier in such a way that changes in said electrical parameter of said strain gauge means having a period or duration longer than said time constant act on the inputs of said differential amplifier in common mode and do not cause changes in said output signal from said differential amplifier whereas changes in said electrical parameter of said strain gauge means having a duration or period shorter than said time constant act on the inputs of said differential amplifier in differential mode and are amplified thereby creating an automatic, continuously operating compensation network to cause said differential amplifier to amplify only those voltage changes which have a sufficiently short duration.

16. An apparatus for simulating the feel of a real control device of a real vehicle, said apparatus comprising:
a display;
a simulated control device;
a lever arm connected to said simulated control device;
a connecting rod coupled to said lever arm;
a first elastic material coupled to said connecting rod to resist movement of said simulated control device over a first range of movement;
a second elastic material coupled to said connecting rod to resist movement of said control device over a second range of movement such that said control device becomes harder to move as it is moved beyond said first range of movement;
a strain gauge mechanically coupled to said simulated control device to sense strain in said lever arm;
an amplifier coupled to said strain gauge so as to generate an output signal proportional to the strain in said control device;
a computer coupled to receive said output signal and coupled to said display, said computer programmed to display on said display an environment in which said simulated vehicle moves and programmed to alter the display of said environment in response to said output signal so as to display the effects on said simulated vehicle's movement in said environment of application of force to said simulated control device.

17. Apparatus of claim 16 further wherein said amplifier includes a resistor-capacitor circuit to prevent changing conditions, such as changing temperatures or changing supply voltage, acting upon said amplifier which have a duration or period longer than a predetermined time constant from affecting the output signal of said amplifier.

18. An apparatus for sensing the amount of pressure placed upon a simulated control device for a simulated vehicle, said apparatus comprising:
a display;
a simulated control device, said control device including means for counteracting said applied force, said counteracting means allowing said control device to be displaced a distance in accordance with a first function when said applied force is within a known range and allowing said control device to be displaced a distance in accordance with a second function when said applied force exceeds said range;
a strain gauge mechanically coupled to said simulated control device such that strain in said simulated control device affects the electrical characteristics of said strain gauge;
an amplifier coupled to said strain gauge so as to generate an output signal based upon the level of strain;
wherein said simulated control device is immovable other than to undergo strain when force is applied to said simulated control device; and
a computer coupled to receive said output signal and coupled to said display, said computer programmed to display on said display an environment in which said simulated vehicle moves and programmed to alter the display of said environment in response to said output signal so as to display the effects on said simulated vehicle's movement in said environment of application of force to said simulated control device.

* * * * *